Patented June 3, 1952

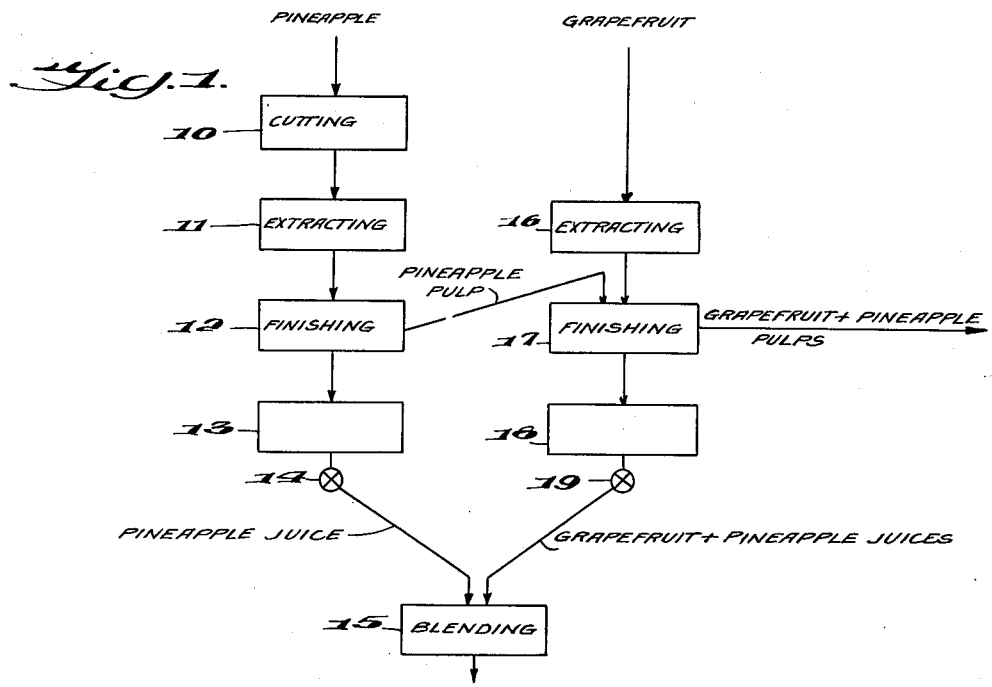
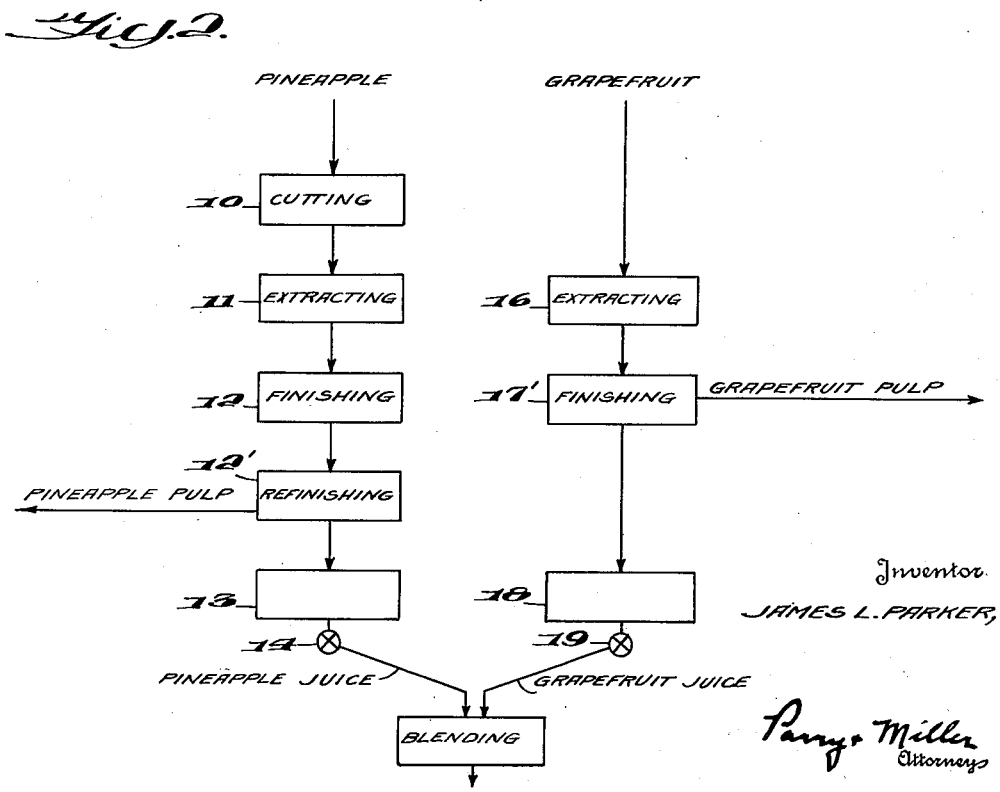
Inventor
JAMES L. PARKER,

2,599,476

UNITED STATES PATENT OFFICE 2,599,476

METHOD OF PRODUCING A JUICE BLEND

James L. Parker, Tampa, Fla., assignor to Prime Products Inc., Tampa, Fla., a corporation of Florida Application February 21, 1949, Serial No. 77,670

8 Claims. (Cl. 99—105)

This invention is directed to a juice blend of pineapple juice and citrus juice or juices, of distinctive flavour. Of the citrus juices grapefruit juice is preferred but the pineapple juice may also be combined with orange juice or with both grapefruit juice and orange juice.

Pineapple juice can be produced most economically by extraction from the skin-containing whole pineapple fruit. However, the juice thus obtained is objectionable as a beverage because of the presence of juice extracted from the skin which contains bitter components which impart an undesirable flavour which is unpleasing to taste. The juice is unpalatable even though pressing or other conventional extraction procedures yield only a limited amount of the available skin juice and the main juice is obtained from the pineapple meat. For the reasons mentioned present commercial practice is preliminarily to remove the skin or rind from the pineapple and to extract juice solely from the pineapple meat. Such juice is pleasing to the taste and of noticeably different flavor due to the absence of the skin juice. An example of the latter procedure is found in Hoyt and Botley Patent 2,045,856, granted June 30, 1936.

I discovered that while pineapple juice extracted from the skin-containing whole fruit is undesirable as a beverage such a juice forms a superior beverage in blend with the juice of citrus fruit. In such a blend the juice extracted from the pineapple skin which is objectionable from a taste standpoint in an unblended pineapple juice definitely enchances the blend. The pineapple skin juice contains delicate essences of desirable flavor as well as bitter components. Such essences are most pleasing in the blend. Yet the bitter components are unnoticeable because they are selectively suppressed by the citrus juice. The blend is more pleasing to the taste than a blend of citrus juice with pineapple juice lacking the skin juice.

I have discovered, moreover, that the greater the amount of skin juice that can be extracted from the whole pineapple fruit the better will be the taste characteristics of the blend with pineapple meat juice and citrus meat juice. If merely conventional extraction procedures are employed only a limited amount of the available skin juice is extracted, as previously mentioned, because the skin juice is not readily released from the pineapple skin proper and areas of the pineapple adjacent thereto. Accordingly, it is proposed to subject the whole pineapple to special and repeated processing so as to obtain most, or at least a substantial part, of the pineapple skin juice as well as the juice of the pineapple meat.

The composition of the juice blend may be varied considerably to produce various pleasing flavours. The pineapple juice, including skin juice, may constitute up to 70 percent of the blend with the balance citrus juice. Ordinarily, however, the pineapple juice will be present in lesser amount, as low as 30 percent. Blends of about 40 percent or 50 percent pineapple juice and about 60 percent or 50 percent grapefruit juice are particularly recommended. As might be expected, the blend of the juices provides a product having a flavour distinctively different from the flavours of the individual juices.

To extract the pineapple skin juice from the skin thorough washing or leaching is required. This is accomplished by one or the other of the citrus or pineapple meat juices. Preferably after the pineapple is subjected to extraction sufficient to remove the main part of the meat juice the skin and pulp is subjected to a further extracting operation simultaneously with the citrus fruit. Such combined operation results in the presence of residual pineapple meat juice and at least a substantial part of the pineapple skin juice in preliminary blend with the citrus juice and results in a change in the solids and acid ratio of the citrus juice which is conducive to better final blending with the major part of the pineapple meat juice. Further, citrus juice, particularly grapefruit juice, appears to be particularly suitable as a washing or leaching agent in recovering the pineapple skin juices in greater quantity. Alternatively, however, the recovery of the pineapple skin juice may also be accomplished in satisfactory manner and amount by repeated processing of the pineapple skin and pulp with all or a substantial amount of recovered pineapple meat juice.

The invention will be more fully understood by reference to the accompanying drawing and the detailed description hereafter. In such drawings:

Fig. 1 is a diagrammatic view illustrating a preferred process for producing a juice blend according to the invention; and Fig. 2 is a corresponding view of an alternative process for producing the juice blend.

Pineapples are preliminarily prepared by subjecting them to decrowning by any suitable cutting device. Soaking in hot water for several minutes prior thereto facilitates the decrowning operation. A bath in water is desirable in any event for cleaning purposes.

According to the process shown in Fig. 1 the decrowned pineapples are subjected to a cutting operation 10 to reduce them to pieces and facilitate juice extraction. This may be accomplished in any suitable food chopper or slicer. This is an optional procedure which in some cases is omitted. In the main extracting operation 11 the pineapples are subjected to pressure which reduces the meat and releases considerable of the juice therefrom. A battery of conventional screw presses is very satisfactory but other types of fruit juice extracting presses may also be employed.

The next stage is a finishing operation in which the main amount of pineapple meat juice is removed from the meat and skin pulp. A conventional fruit juice finisher machine of the type employing a rotary screw with surrounding screen, commonly employed in tomato juice production, is recommended but other conventional types of finisher machines can also be used. The screened meat juice, containing only negligible amount of the skin juice is collected in a suitable tank 13 from which it is delivered in appropriate amount under control of valve 14 to a blending tank 15.

Citrus fruit, preferably grapefruit, is processed in a conventional juice line. This includes, following washing of the fruit, an extracting operation 16 in conventional burr-type or other conventional citrus fruit presses or extractors. This is followed by a finishing operation 17 in conventional finisher machines which may be of the same type in operation 12 in the pineapple line.

To recover the skin juices from the pineapple the skin and other pineapple pulp from which the major portion of the pineapple meat juice has been removed in operation 12 is fed to finishing operation 17 simultaneously with the grapefruit. The further squeezing in this operation of the pineapple skin in the presence of the substantial body of grapefruit juice being produced simultaneously causes the juice to be washed out of the pineapple skin. Such skin juice with any further amount of pineapple meat juice recovered from the pulp is removed in admixture with the grapefruit juice while the combined grapefruit and pineapple pulps which have been screened out are removed together as waste.

The mixed juices from finishing operation 17 are collected in tank 18 from which they are conducted in suitable amount under control of valve 19 to the blending tank 15. Therein they are combined with the main body of pineapple meat juice from collecting tank 13. The amount of grapefruit and pineapple meat juices blended together will be according to taste, as explained above. Both the pineapple and grapefruit processing lines may be operated continuously and simultaneously.

Blending is accomplished with any desired type of agitation. I prefer to sweeten blended juices by the addition of sugar or dextrose in amounts according to taste.

As previously mentioned the addition of the pineapple skin juice with the grapefruit juice, accomplished in finishing operation 17, causes a change in the solids and acid ratio of the grapefruit juice and this appears to have beneficial effect in the speed and homogeneity of blending subsequently accomplished in tank 15.

The juice blend from tank 15 is further processed in any of the ways conventionally employed with unblended fruit juice. For merchandising as a canned juice the blended juice from tank 15 is deaerated, then flash pasteurized at a temperature of 190 to 200° F., canned and immediately cooled. It may be concentrated through conventional technique and/or frozen under known quick freezing procedure.

In the modified process of producing the pineapple juice and citrus juice blend illustrated in Fig. 2 the operations and apparatus employed are the same except with respect to the manner of recovering and handling the pineapple skin juice. Instead of recovering the same in the presence of the grapefruit juice in finishing operation 17 the skin and other pulp of the pineapple together with the main amount of the pineapple juice from finishing operation 12 are subjected to a second finishing or refinishing operation 12'. The further pressing of the skin in such operation in the presence of the previously released body of pineapple meat juice causes the skin juice to be washed out and it is conducted in admixture with the meat juice to collecting tank 13. Pineapple skin and meat pulp are separately removed as waste from operation 12'. This may employ a conventional fruit finisher as employed in operation 12. In finishing operation 17' in the grapefruit line a similar fruit juice finisher machine may be employed. The grapefruit juice is separately recovered and is blended with both the pineapple meat juice and skin juice in blending tank 15. Further procedure will be as described in connection with the process of Fig. 1.

It will be understood that the finishing operations conducted in connection with the pineapple and grapefruit are extracting operations. They may be identified as finishing extracting operations and the initial operations conducted in stages 11 and 16 in the fruit presses may be identified as press extracting operations. The two collectively serve to secure relatively complete extraction of the juices. It will be evident under the procedures of both Figs. 1 and 2 the pineapple pulp is subjected to repeated finish extracting operations to secure recovery of the skin juice. Two such operations are found adequate to recover the major portion of such juice under ordinary conditions but one or more additional finishing operations may be added if found necessary. As before stated the pineapple skin juice adds valuable taste values to the ultimate juice blend and results in the product which has found ready acceptance upon the commercial market.

While it is my present belief that the juice in and adjacent the pineapple skin contains the delicate pineapple flavour desired for the blend and not found in conventionally processed pineapple juice, it is also possible that certain of such flavours are contained in the pineapple meat and not readily removed therefrom. If such be the case, the repeated finishing of the pineapple is calculated to recover any such flavours from the meat since the meat pulp as well as the skin from the first finishing operation are refinished together in the presence of a large body of grapefruit or pineapple juice which serves as a washing agent.

Finally, it should be mentioned that the skin and adjacent parts of pineapple containing the skin juice are much smaller in capacity than the pineapple meat so that the amount of skin juice is in relatively low ratio to the meat juice.

While, therefore, the skin juice constitutes only a very low percentage, less than 10 percent, of the pineapple and citrus juice blend, the pleasing flavours contained in the skin juice are sufficiently strong to influence the flavours of the blend.

I claim:

1. The method of producing pineapple juice suitable for a juice blend which includes subjecting the pineapple skin to extraction in the presence of a grapefruit juice so as to wash out the skin juice from the pineapple skin and recovering the pineapple skin juice with the grapefruit juice.

2. The method of producing pineapple juice for a juice blend which includes subjecting skin-bearing pineapple to extraction adapted to recover the major part of the pineapple meat juice then subjecting the resulting skin-containing pulp to further extraction in the presence of a body of juice from the group consisting of pineapple meat juice and grapefruit juice and recovering the pineapple skin juice with said juice body.

3. The method of producing pineapple juice suitable for blending which comprises subjecting skin-bearing pineapple to extraction adapted to remove the pineapple meat juice, then subjecting the resulting skin-containing pulp to further extraction, and in said further extraction simultaneously subjecting citrus fruit to extraction, and recovering the skin juice from the pineapple skin with the juice of said citrus fruit.

4. The method of producing pineapple juice suitable for blending which comprises subjecting skin-bearing pineapple to extraction adapted to remove the pineapple meat juice, then subjecting the resulting skin-containing pulp together with said pineapple meat juice to further extraction and recovering the skin juice from the pineapple skin with said pineapple meat juice.

5. The method of producing pineapple juice suitable for blending which comprises subjecting skin-bearing pineapple to press extraction and then to a first finish extraction to recover the pineapple meat juice, then subjecting the resulting skin-containing pulp to a further finish extraction in the presence of a body of liquid comprising a juice from the group consisting of pineapple juice, grapefruit juice, and orange juice and recovering the skin juice from the pineapple skin with said juice body.

6. The method of producing a juice blend which comprises extracting the pineapple meat juice from skin-containing pineapple, extracting the juice from grapefruit, extracting in the presence of, and recovering with, one of said juices the skin juice from the pineapple skin and combining controlled amounts of the pineapple meat juice and grapefruit juice into a juice blend containing said pineapple skin juice.

7. The method of producing a juice blend which comprises subjecting skin-bearing pineapple to press extraction to recover the pineapple meat juice, subjecting grapefruit to press extraction, then combining with said grapefruit the skin containing pineapple pulp from the pineapple finish extraction and simultaneously subjecting said grapefruit and said pineapple pulp to a finish extraction, then combining controlled amounts of the juices recovered by the several finish extractions into a juice blend.

8. The method of producing a juice blend which comprises subjecting skin-bearing pineapple to press extraction and then to a first finish extraction, then subjecting the resulting skin-bearing pulp to further finish extraction together with the juices resulting from said first finish extraction, subjecting grapefruit to press and finish extractions to recover the grapefruit juice and combining controlled amounts of the pineapple juice recovered from said further finish extraction and the grapefruit juice into a juice blend.

JAMES L. PARKER.

REFERENCES CITED

The following references are of record in the file of this patent:

UNITED STATES PATENTS

| Number | Name | Date |
|---|---|---|
| 1,166,674 | Gould | Jan. 4, 1916 |
| 1,362,868 | Johnson | Dec. 21, 1920 |
| 1,735,118 | Kung | Nov. 12, 1929 |
| 2,045,856 | Hoyt | June 30, 1936 |
| 2,086,911 | Hill | July 13, 1937 |
| 2,092,729 | Eberts | Sept. 7, 1937 |
| 2,143,642 | Bias | Jan. 10, 1939 |
| 2,510,679 | Bruce | June 6, 1950 |